United States Patent
Gekinozu

(10) Patent No.: US 11,108,326 B2
(45) Date of Patent: Aug. 31, 2021

(54) DC-DC CONVERTER

(71) Applicant: FUJI ELECTRIC CO., LTD., Kanagawa (JP)

(72) Inventor: Masakazu Gekinozu, Mie (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/800,063

(22) Filed: Feb. 25, 2020

(65) Prior Publication Data
US 2020/0195144 A1 Jun. 18, 2020

Related U.S. Application Data

(63) Continuation of application No. PCT/JP2018/046338, filed on Dec. 17, 2018.

(51) Int. Cl.
| | | |
|---|---|---|
| H02M 3/158 | (2006.01) | |
| H02M 3/335 | (2006.01) | |
| H02M 7/5387 | (2007.01) | |
| H02M 1/00 | (2006.01) | |

(52) U.S. Cl.
CPC ....... H02M 3/158 (2013.01); H02M 3/33507 (2013.01); H02M 3/33569 (2013.01); H02M 7/5387 (2013.01); *H02M 1/0003* (2021.05)

(58) Field of Classification Search
CPC ............. H02M 3/158; H02M 3/33507; H02M 3/33569; H02M 7/5387
See application file for complete search history.

(56) References Cited

U.S. PATENT DOCUMENTS

| | | | |
|---|---|---|---|
| 6,292,377 B1 | 9/2001 | Sasaki | |
| 9,379,617 B2 | 6/2016 | Nishikawa | |
| 2002/0109469 A1* | 8/2002 | Ito | H05B 41/28 315/291 |
| 2013/0181519 A1* | 7/2013 | Lee | H02J 3/46 307/24 |

(Continued)

FOREIGN PATENT DOCUMENTS

| | | |
|---|---|---|
| JP | 2823896 | 11/1998 |
| JP | H11-285249 | 10/1999 |

(Continued)

OTHER PUBLICATIONS

International Search Report dated Feb. 19, 2019 with respect to No. PCT/JP2018/046338.

(Continued)

*Primary Examiner* — Rafael O De Leon Domenech
(74) *Attorney, Agent, or Firm* — IPUSA, PLLC

(57) ABSTRACT

A DC-DC converter includes current resonant converter units connected in parallel. The converter units include respective control devices each of which includes a control circuit, a gate-pulse generating circuit, and the like. Taking into account a relational characteristic of a switching frequency and an output voltage of each of the converter unit, a lowest frequency as a common switching frequency, from among switching frequencies with respect to a same output voltage, is shared by the control circuits. The converter units are operated with drive pulses each of which is at the common switching frequency.

6 Claims, 11 Drawing Sheets

(56) References Cited

U.S. PATENT DOCUMENTS

| | | | |
|---|---|---|---|
| 2014/0028092 A1* | 1/2014 | Takeshima | H02M 3/33507 307/10.1 |
| 2014/0265588 A1* | 9/2014 | McCleer | H02M 7/53871 307/52 |
| 2014/0355313 A1 | 12/2014 | Nishikawa | |
| 2015/0249394 A1* | 9/2015 | Liu | H02M 3/285 363/21.02 |
| 2015/0303815 A1* | 10/2015 | Chen | H02M 3/158 363/21.04 |
| 2015/0349649 A1* | 12/2015 | Zane | H02M 3/33592 363/21.03 |
| 2016/0294204 A1* | 10/2016 | Deokar | H02J 7/0013 |
| 2018/0301995 A1* | 10/2018 | Chang | H02M 3/33546 |
| 2018/0309373 A1* | 10/2018 | Chang | H02M 3/33523 |
| 2019/0115830 A1* | 4/2019 | Giuliano | H02M 3/07 |
| 2020/0287468 A1* | 9/2020 | Mizutani | H02M 7/217 |

FOREIGN PATENT DOCUMENTS

| | | |
|---|---|---|
| JP | 2001-008452 | 1/2001 |
| JP | 2001-078449 | 3/2001 |
| JP | 2010-041855 | 2/2010 |
| JP | 2014-014232 | 1/2014 |
| JP | 5928913 | 6/2016 |
| JP | 2016-167905 | 9/2016 |
| JP | 2018-019578 | 2/2018 |

OTHER PUBLICATIONS

Written Opinion of The International Searching Authority dated Feb. 19, 2019 with respect to No. PCT/JP2018/046338.

Office Action dated Nov. 5, 2020 issued with respect to the corresponding German Patent Application No. 112018004240.5.

\* cited by examiner

DC-DC CONVERTER

CROSS-REFERENCE TO RELATED APPLICATION

The present application is a continuation application of International Application No. PCT/JP2018/046338, filed Dec. 17, 2018, the contents of which are incorporated herein by reference in their entirety.

BACKGROUND OF THE INVENTION

1. Field of the Invention

The present disclosure relates to a DC-DC converter in which a plurality of converter units that perform DC-to-DC conversion are connected in parallel.

2. Description of the Related Art

Japanese Unexamined Patent Application Publication Nos. 2010-41855 and 2016-167905 and Japanese Patent No. 2823896 disclose DC-DC converters.

SUMMARY

The present disclosure relates to the following aspects. A first aspect is directed to a DC-DC converter including:
  a plurality of converter units electrically connected in parallel, each converter unit including:
    a DC-to-AC converter configured to convert DC power to AC power through operation of semiconductor switching elements; and
    a rectifier circuit electrically connected at an AC output side of the DC-to-AC converter via a resonant circuit and an insulating transformer; and
  a plurality of control devices with respect to the respective converter units, each control device including:
    a control circuit configured to generate a modulation-rate command based on an output voltage and an output current of a corresponding converter unit; and
    a pulse generating circuit configured to generate, based on the modulation-rate command, a drive pulse applied to each semiconductor switching element,
  wherein, taking into account a relational characteristic of a switching frequency and an output voltage of each converter unit, a lowest frequency as a common switching frequency, from among switching frequencies with respect to a same output voltage, is shared by multiple control circuits, and wherein all of the converter units are configured to operate with drive pulses each of which is at the common switching frequency.

A second aspect is directed to a DC-DC converter according to the first aspect in which a phase of each drive pulse used in the converter units is varied such that output voltages of the converter units are equalized.

A third aspect is directed to a DC-DC converter according to the second aspect in which one or more converter units are controlled in phase modulation based on the modulation-rate command, such that the phase of each drive pulse is varied.

A fourth aspect is directed to a DC-DC converter according to any one of the first to third aspects in which each DC-to-AC converter includes a full-bridge circuit including the semiconductor switching elements or a half-bridge circuit, and each rectifier circuit includes a full-wave rectifier circuit or a half-wave rectifier circuit.

DESCRIPTION OF THE EMBODIMENTS

Related art information relevant to the present disclosure recognized by the inventor will be provided below with reference to FIGS. 5 to 12B.

Figure 5:
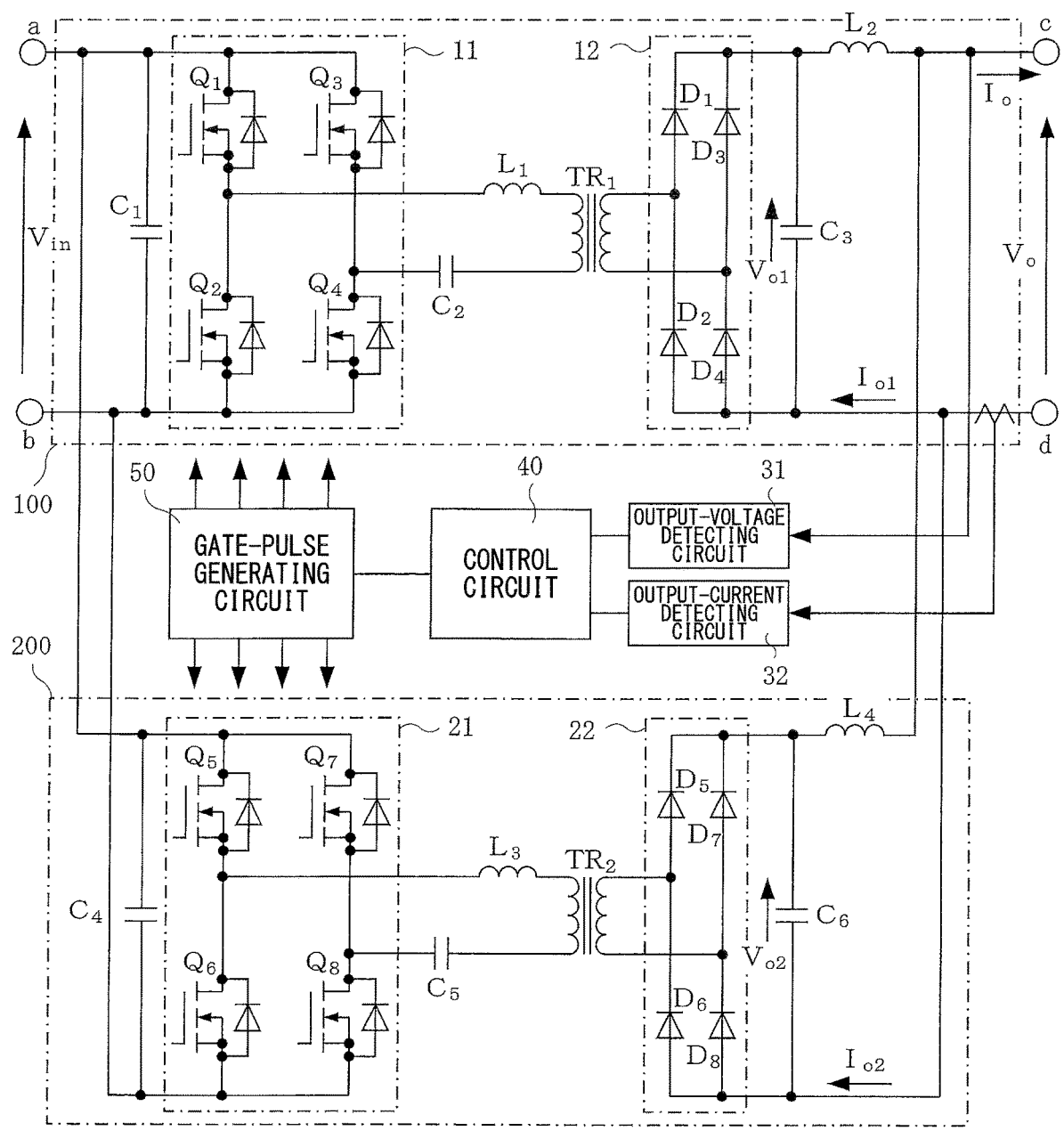
FIG. 5 is a circuit diagram according to first related art.

FIG. 5 illustrates a DC-DC converter in first related art.

In FIG. 5, 100 and 200 represent resonant converter units each of which performs DC-to-DC conversion. These converter units 100 and 200 have identical configurations and are connected in parallel, between input terminals a and b and output terminals c and d.

11 and 21 represent DC-to-AC converters each of which converts a DC input voltage (voltage across each of capacitors $C_1$ and $C_4$) $V_{in}$ into an AC voltage, and the respective DC-to-AC converters include full-bridge circuits consisting of semiconductor switching elements $Q_1$ to $Q_4$; and $Q_5$ to $Q_8$.

AC output terminals of the DC-to-AC converter 11 are connected at an AC input side of a rectifier circuit 12 consisting of diodes $D_1$ to $D_4$, via a resonant reactor $L_1$, a resonant capacitor $C_2$, and an insulating transformer $TR_1$. AC output terminals of the DC-to-AC converter 21 are connected at an AC input side of a rectifier circuit 22 consisting of diodes $D_5$ to $D_8$, via a resonant reactor $L_3$, a resonant capacitor $C_5$, and an insulating transformer $TR_2$.

Capacitors $C_3$ and $C_6$ are connected between DC output terminals of respective rectifier circuits 12 and 22, and reactors $L_2$ and $L_4$ are connected between each one end of the respective capacitors $C_3$ and $C_6$ and the DC output terminal c.

As is well known, a current resonant DC-DC converter is capable of controlling an output current of each of the DC-to-AC converters 11 and 21 to be a sinusoidal wave, by using resonant phenomena caused by a resonant reactor and a resonant capacitor.

A control device for controlling the converter units 100 and 200 is configured as follows.

A voltage $V_o$ across the output terminals c and d is detected by an output-voltage detecting circuit 31, and a current flowing to the output terminal d is detected by an output-current detecting circuit 32. These detected values of voltage and current are input to a control circuit 40. The control circuit 40 generates a modulation-rate command for controlling detected values of voltage and current to respective command values. In a PWM control, in which the modulation-rate command is compared with a carrier, the gate-pulse generating circuit 50 generates common gate pulses to the switching elements $Q_1$ to $Q_4$; and $Q_5$ to $Q_8$ of the DC-to-AC converters 11 and 21, to output the pulses. Specifically, the switching elements $Q_1$ and $Q_5$ are turned on or off by applying identical pulses, and the switching elements $Q_2$ and $Q_6$; $Q_3$ and $Q_7$; and $Q_4$ and $Q_8$ are turned on or off by applying respective identical pulses.

However, even when operation is performed at equal switching frequencies such that gate pulses are commonly applied to the switching elements $Q_1$ to $Q_4$; and $Q_5$ to $Q_8$ of the respective DC-to-AC converters 11 and 21, output voltages $V_{o1}$ and $V_{o2}$ are generally not equal due to variations in characteristics of components that configure the units 100 and 200. Thus, an output voltage $V_o$ of the entire converter varies.

Figure 6:
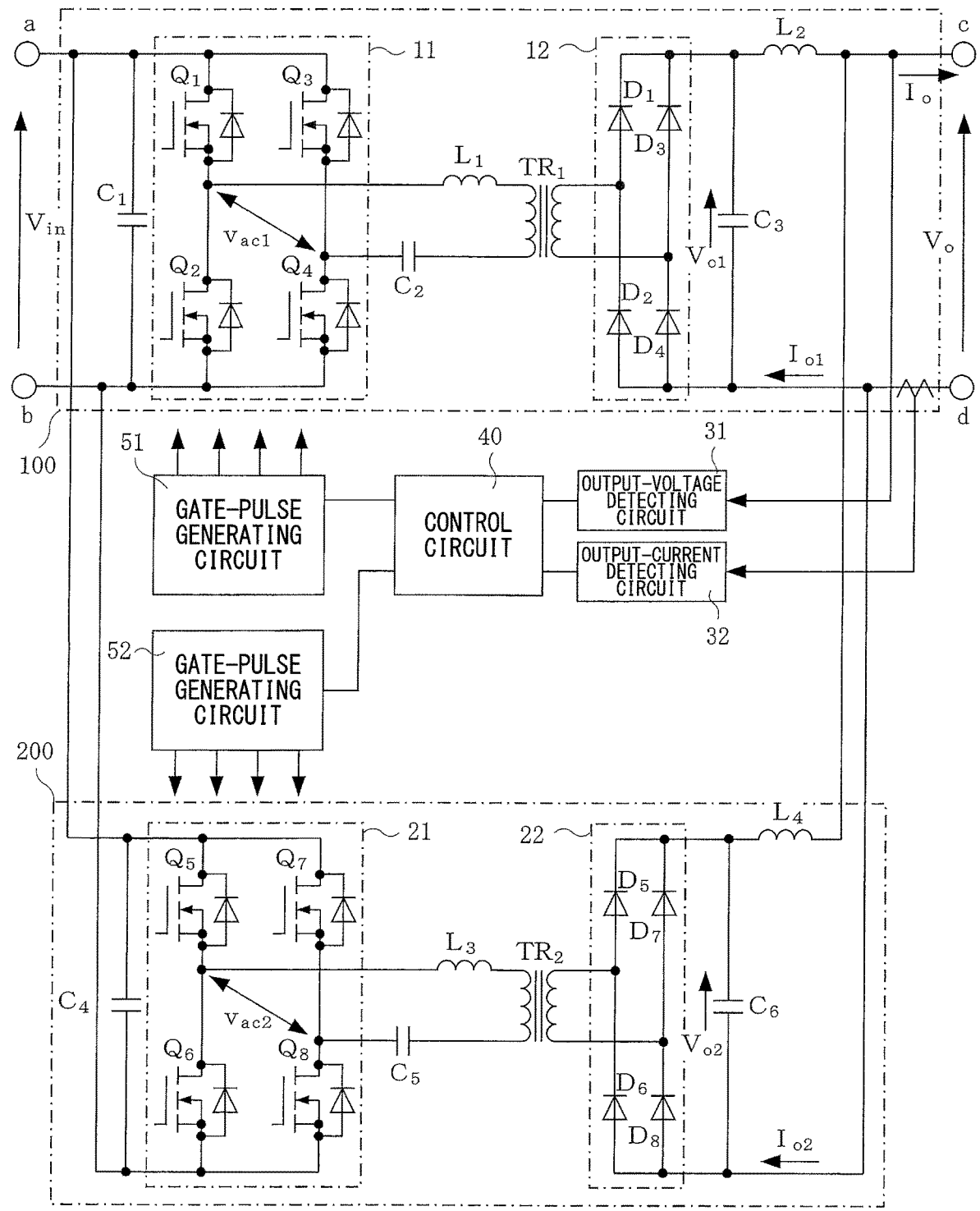
FIG. 6 is a circuit diagram according to second related art.

FIG. 6 is a block diagram for second related art. A configuration in the figure is the same as the configuration of the DC-DC converter described in Patent document 1.

Figure 7:
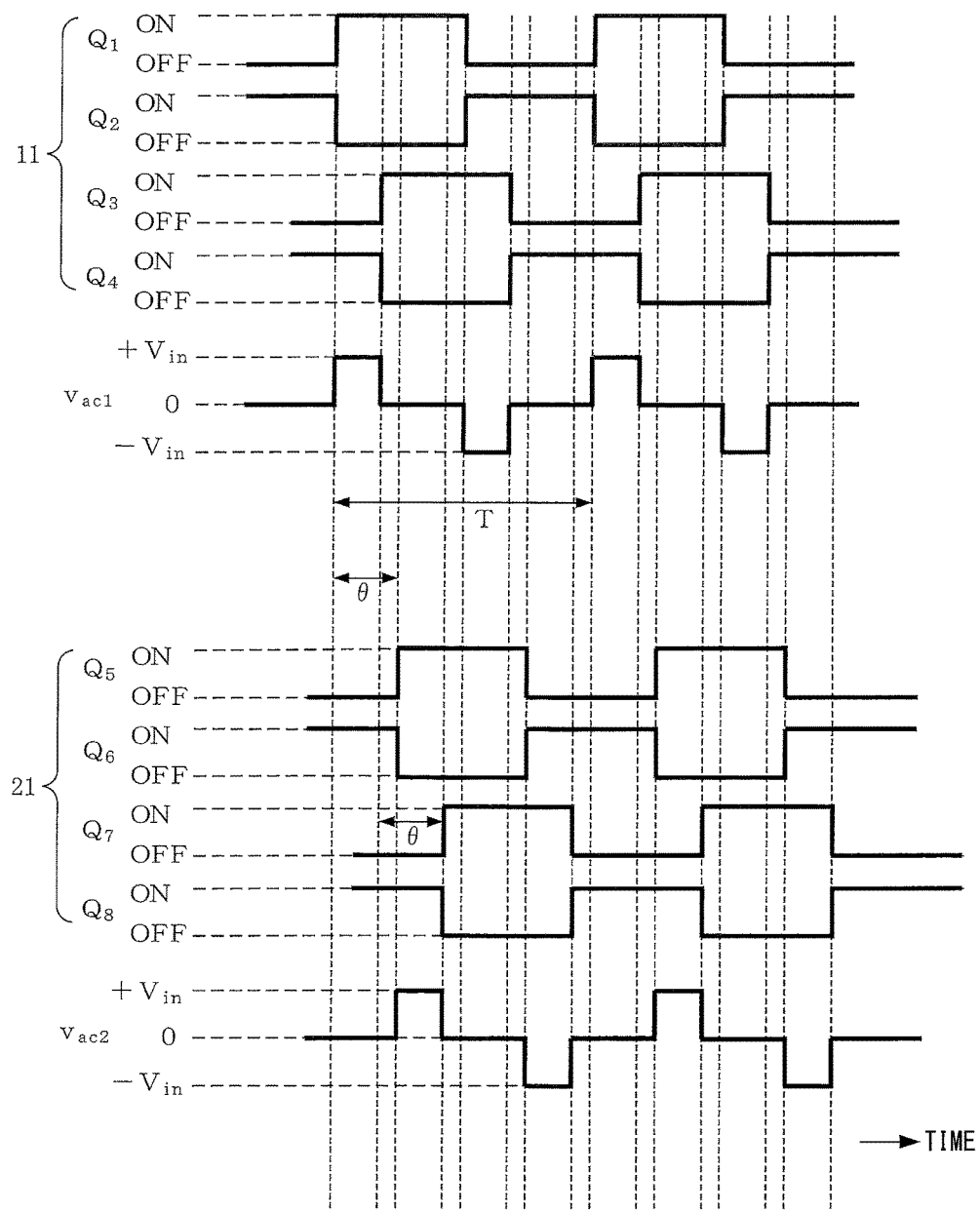
FIG. 7 is a timing chart illustrating the operation according to second related art.

According to the second related art, gate-pulse generating circuits 51 and 52 are provided with respect to respective DC-to-AC converters 11 and 21. As illustrated in FIG. 7, a phase difference between a gate pulse applied to each of switching elements $Q_1$ to $Q_4$ of a DC-to-AC converter 11 and a gate pulse applied to each of switching elements $Q_5$ to $Q_8$ of a DC-to-AC converter 21, is shown. Note that in FIGS. 6 and 7, $v_{ac1}$ and $v_{ac2}$ represent AC voltages of the DC-to-AC converters 11 and 21, respectively, and T represents a switching cycle.

According to the related art, even when there are some variations in characteristics of components of the converter units 100 and 200, by giving a phase difference between gate pulses, a pulsation of an output current $I_o$ is absorbed to some extent and thus variation in an output voltage $V_o$ can be suppressed.

Figure 8:
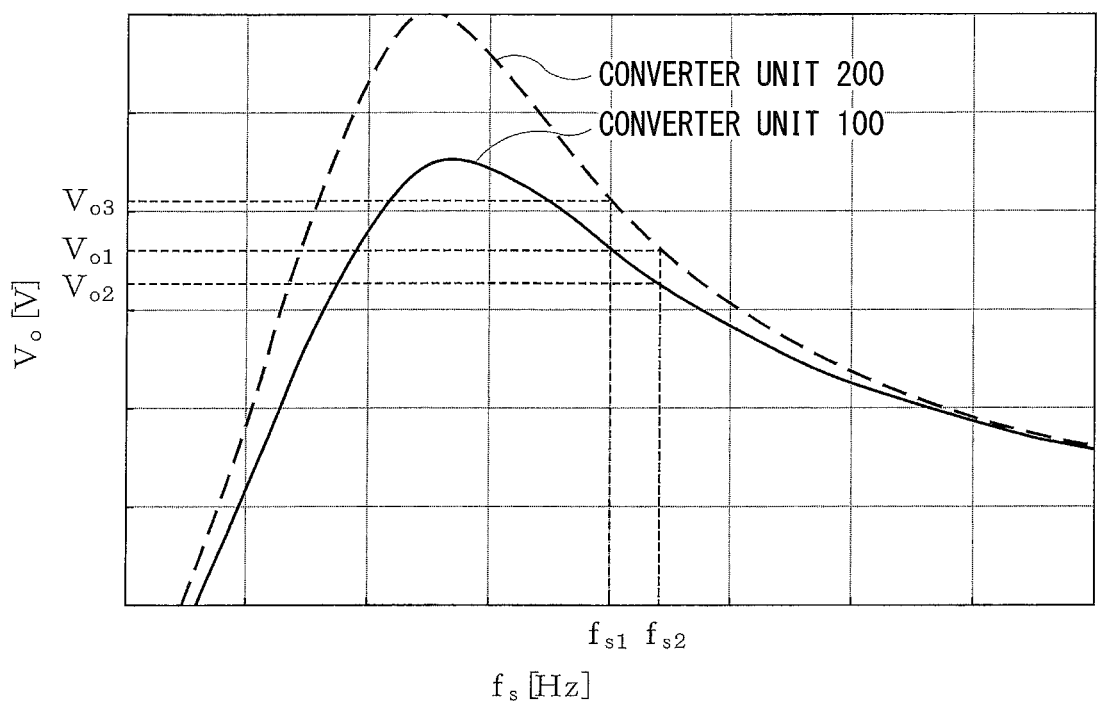
FIG. 8 is a waveform diagram illustrating a relation between a switching frequency and an output voltage of each converter unit according to second related art.

However, when characteristics of a switching frequency and an output voltage for each of the converter units 100 and 200 are provided, for example, as illustrated in FIG. 8, a target value of the output voltage is set to $V_{o1}$. In this case, when a switching frequency is set to $f_{s1}$ in accordance with characteristics of the converter unit 100, an output voltage of the converter unit 200 is represented by $V_{o3}$. As a result, a difference between $V_{o3}$ and an output voltage $V_{o1}$ of the converter unit 100 appears. Additionally, when a switching frequency is set to $f_{s2}$ in accordance with characteristics of the converter unit 200, an output voltage of the converter unit 100 is represented by $V_{o1}$. As a result, a difference between $V_{o1}$ and the output voltage $V_{o1}$ of the converter unit 200 appears.

In any case, output currents $I_{o1}$ and $I_{o2}$ are imbalanced due to the difference between output voltages of the converter units 100 and 200, which results in an increase in variations in the output voltage $V_o$.

Figure 9:
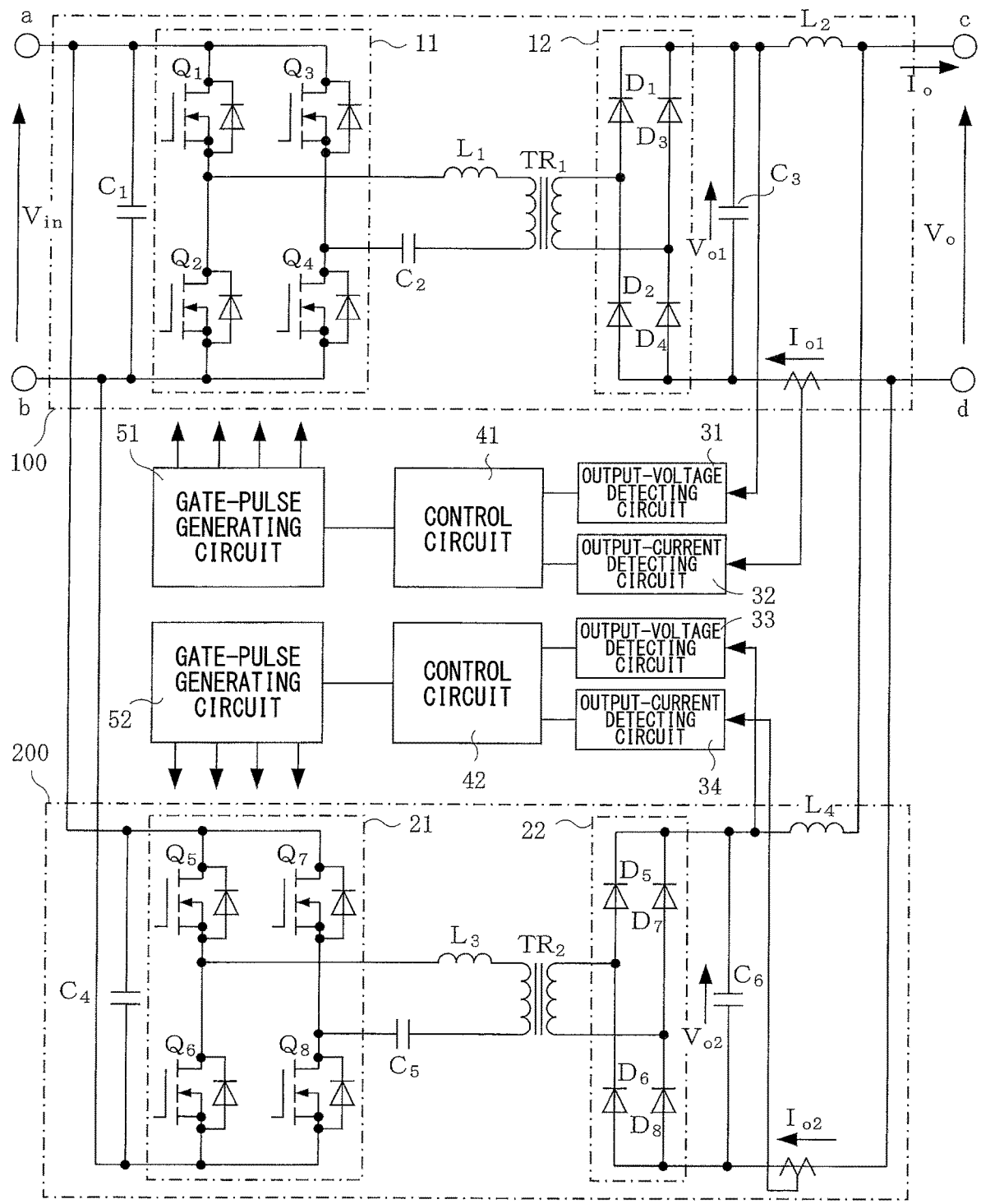
FIG. 9 is a circuit diagram according to third related art.

FIG. 9 is a block diagram for third related art. A configuration in the figure is the same as the configuration of a power supply described in Patent document 2.

In the related art, with respect to one converter unit 100, an output-voltage detecting circuit 31, an output-current detecting circuit 32, a control circuit 41, and a gate-pulse generating circuit 51 are provided. Additionally, with respect to another converter unit 200, an output-voltage detecting circuit 33, an output-current detecting circuit 34, a control circuit 42, and a gate-pulse generating circuit 52 are provided. By varying switching frequencies at which the units 100 and 200 operate, the control circuits 41 and 42 perform control such that output voltages $V_{o1}$ and $V_{o2}$ of the units 100 and 200 are equal.

In other words, in FIG. 8 above, when a target value of an output voltage is set to $V_{o1}$, a control is performed such that a switching frequency at which one converter unit 100 operates is set to $f_{s1}$; and a switching frequency at which the other converter unit 200 operates is set to $f_{s2}$.

In the related art, the output voltages $V_{o1}$ and $V_{o2}$ of the converter units 100 and 200 are equal and thus average powers supplied by the respective units are balanced. However, switching frequencies at which the respective units operate differ, which results in pulsations of an output voltage and output currents at frequencies lower than a switching frequency.

Figure 10:
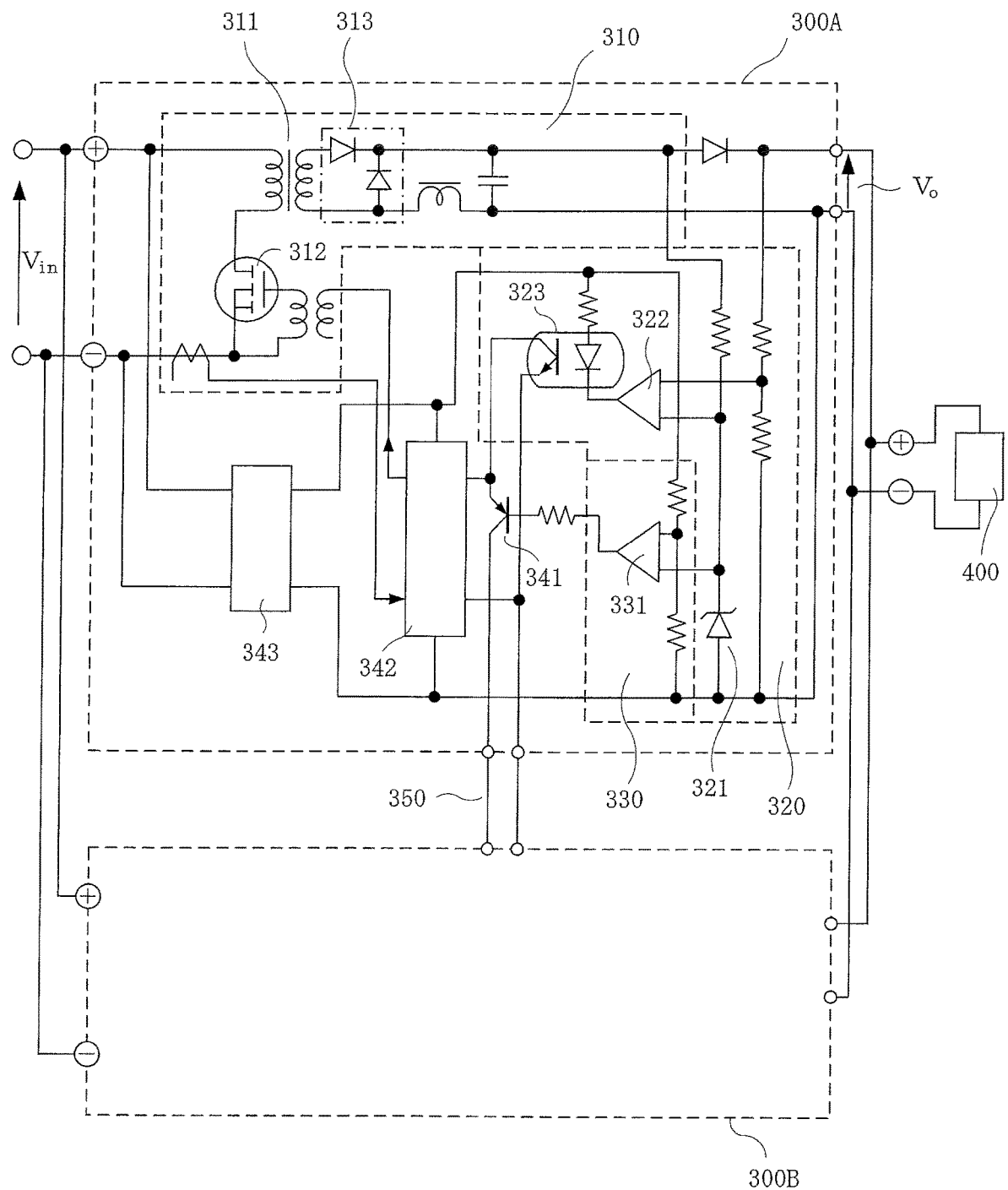
FIG. 10 is a circuit diagram according to fourth related art.

FIG. 10 is directed to fourth related art and illustrates a parallel operation circuit of a DC-DC converter described in Patent document 3.

In FIG. 10, 300A and 300B represent respective converter units connected in parallel, each converter unit having an identical configuration. Further, 310 represents a power supply, 311 represents a transformer, 312 represents an FET, 313 represents a rectifier circuit, 320 represents a differential voltage detector; 321 represents a zener diode, and 322 represents a difference amplifier. 323 represents a photo coupler, 330 represents a voltage detector, 331 represents a difference amplifier, 341 represents a transistor, 342 represents a constant voltage controller, 343 represents an auxiliary power supply, 350 represents a signal line between both units 300A and 300B, and 400 represents a load.

In the related art, output sides of the photo couplers 323, each of which outputs a differential signal to a given constant voltage controller 342 of each of the units 300A and 300B, are interconnected via the signal line 350, and in a normal mode, a difference between output voltages of both units 300A and 300B is eliminated. For example, when failure of a resistor or the like used in the error voltage detecting unit 320 of the unit 300A occurs, the transistor 341 is turned off through output of the differential amplifier 331, the signal line 350 between the units 300A and 300B is electrically disconnected, and a predetermined voltage is supplied to the load 400 by a proper unit 300B.

CITATION LIST

Patent Document

Patent document 1: Japanese Unexamined Patent Application Publication No. 2010-41855 (paragraphs 0015 to 0054, FIGS. 1 and 2, etc.)
Patent document 2: Japanese Unexamined Patent Application Publication No. 2016-167905 (paragraphs 0028 to 0069, FIGS. 1 and 3, etc.)
Patent document 3: Japanese Patent No. 2823896 (lines 3 to 45 in the right-hand column on page 2, FIG. 2, etc.)

SUMMARY OF DISCLOSURE

Figure 11:
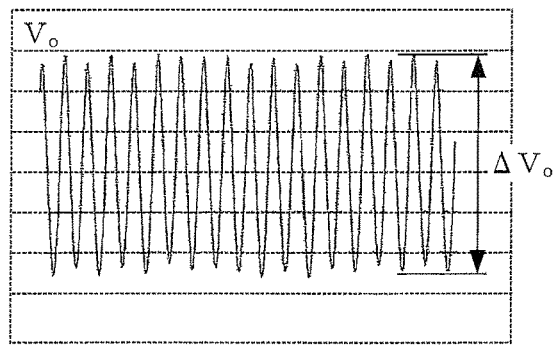
FIG. 11 is a waveform diagram illustrating an output voltage according to first related art.
Figure 12A:
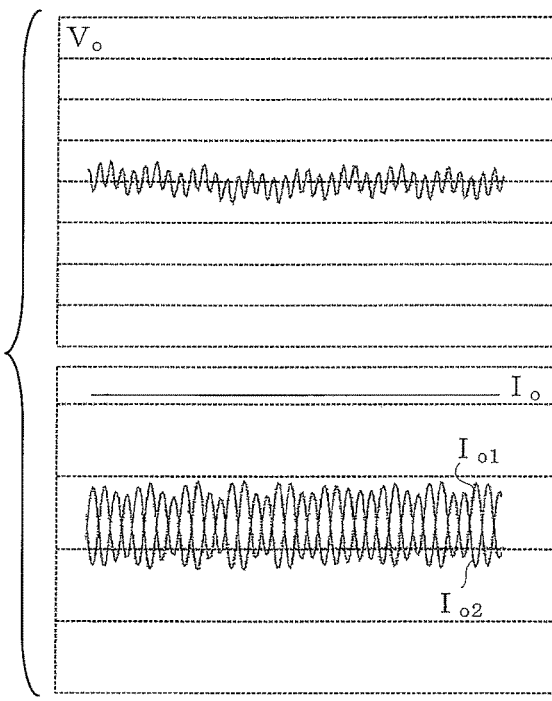
FIGS. 12A and 12B are waveform diagrams illustrating output voltages and output currents according to second related art.
Figure 12B:
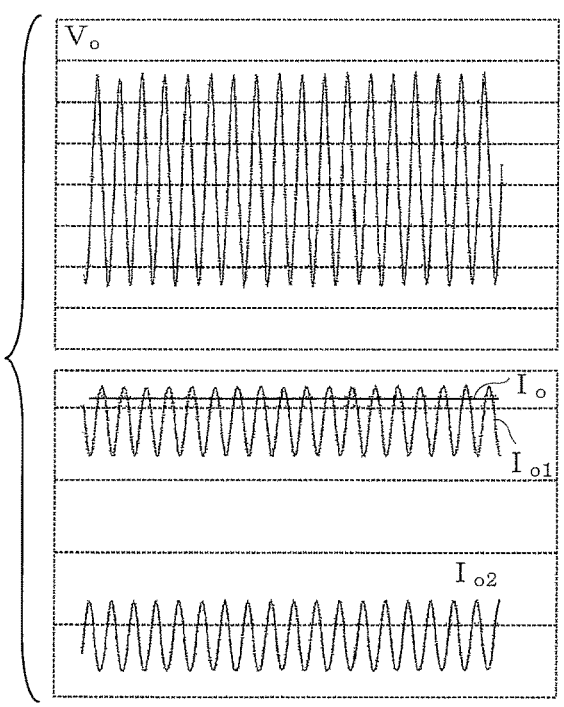
Figure 13:
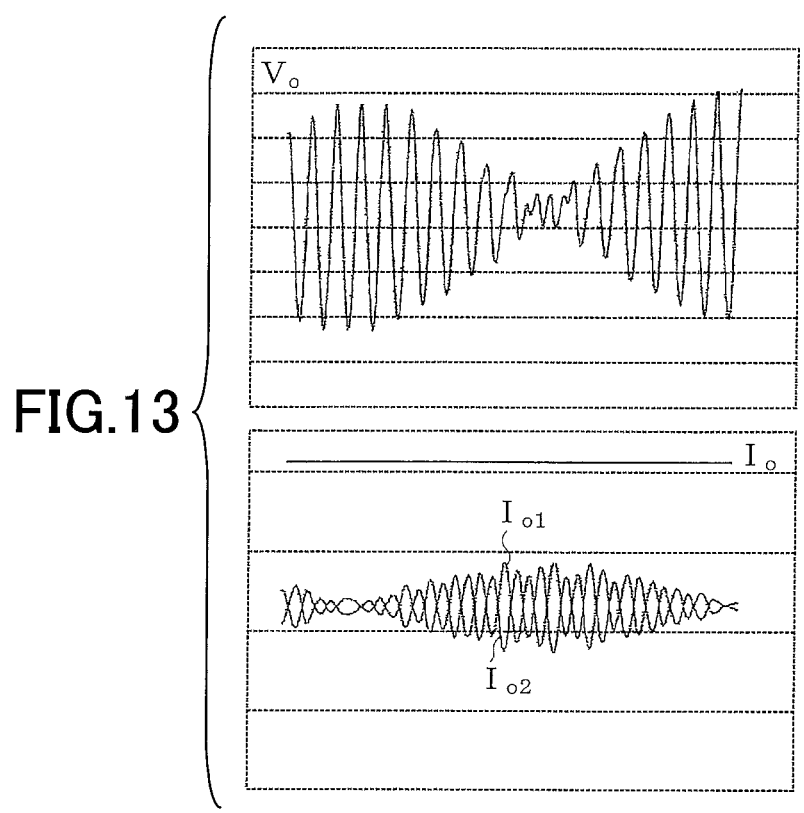
FIG. 13 is a waveform diagram illustrating an output voltage and an output current according to third related art.

FIG. 11 is a waveform diagram for an output voltage in first related art. FIGS. 12A and 12B are waveform diagrams for an output voltage and an output current in second related art. FIG. 13 is a waveform diagram for an output voltage and an output current in third related art.

According to first related art, common gate pulses from a single control circuit 40 through a gate pulse generating circuit 50 are applied to converter units 100 and 200. Phases of output currents $I_{o1}$ and $I_{o2}$ of the respective units 100 and 200 are in phase. Thereby, a changed amount $\Delta V_o$ of an output voltage $V_o$ is increased as illustrated in FIG. 11.

According to second related art, the units 100 and 200 are driven with gate pulses having differing phases, by using a single control circuit 40 and gate pulse generating circuits 51 and 52. FIGS. 12A and 12B are the waveform diagrams in which a phase difference between gate pulses is 180 degrees. Current $I_{o1}$ and $I_{o2}$ between which a phase difference is 180 degrees flow from the respective units 100 and 200. Thus, when there is no variation in characteristics of components, average values of the output currents $I_{o1}$ and $I_{o2}$ are balanced. Thereby, variation in an output voltage $V_o$ is decreased (FIG. 12A).

In contrast, when there is variation in characteristics of components, average values of the output currents $I_{o1}$ and $I_{o2}$ of the respective units 100 and 200 differ greatly, and as a result, variation in an output voltage $V_o$ is increased (FIG. 12B).

According to third related art as illustrated in FIG. 13, control circuits 41 and 42 drive respective units 100 and 200 at different switching frequencies, by using gate pulse generating circuits 51 and 52. Thus, for example, a phase difference between output currents $I_{o1}$ and $I_{o2}$ is set to 180 degrees, and average values of the output currents are balanced. However, when there is variation in characteristics of components, an output voltage $V_o$ and output currents $I_{o1}$ and $I_{o2}$ are pulsated at frequencies lower than a switching frequency, as seen from FIG. 13.

As described above, according to first to third related art, it is difficult to avoid variation in an output voltage $V_o$; imbalance between output currents $I_{o1}$ and $I_{o2}$ of the converter units 100 and 200; and pulsations of the output voltage $V_o$ and the output currents $I_{o1}$ and $I_{o2}$.

According to fourth related art, a signal for eliminating a difference between output voltages of two converter units that operate in parallel is interrupted in a case of failure of one unit occurring; subsequently, power is supplied to a load by the other unit such that operation is continuously performed. This is not a concept to solve a problem in suppression of variation in an output voltage when the two units continue to operate in parallel, as well as avoiding imbalance between output currents of the respective units, etc.

In light of the above, a problem to be solved by the present disclosure is to provide a DC-DC converter so as to avoid variation in an output voltage, imbalance between output currents of converter units, and pulsations of the output voltage and the output currents, when a plurality of converter units are operated in parallel.

Advantageous Effects of Disclosure

According to the present disclosure, variation in an output voltage is suppressed, and output currents of a plurality of converter units are balanced. Further, pulsations of the output voltage and the output currents can be minimized.

Embodiments of the present disclosure will be hereinafter described with reference to the drawings.

Figure 1:
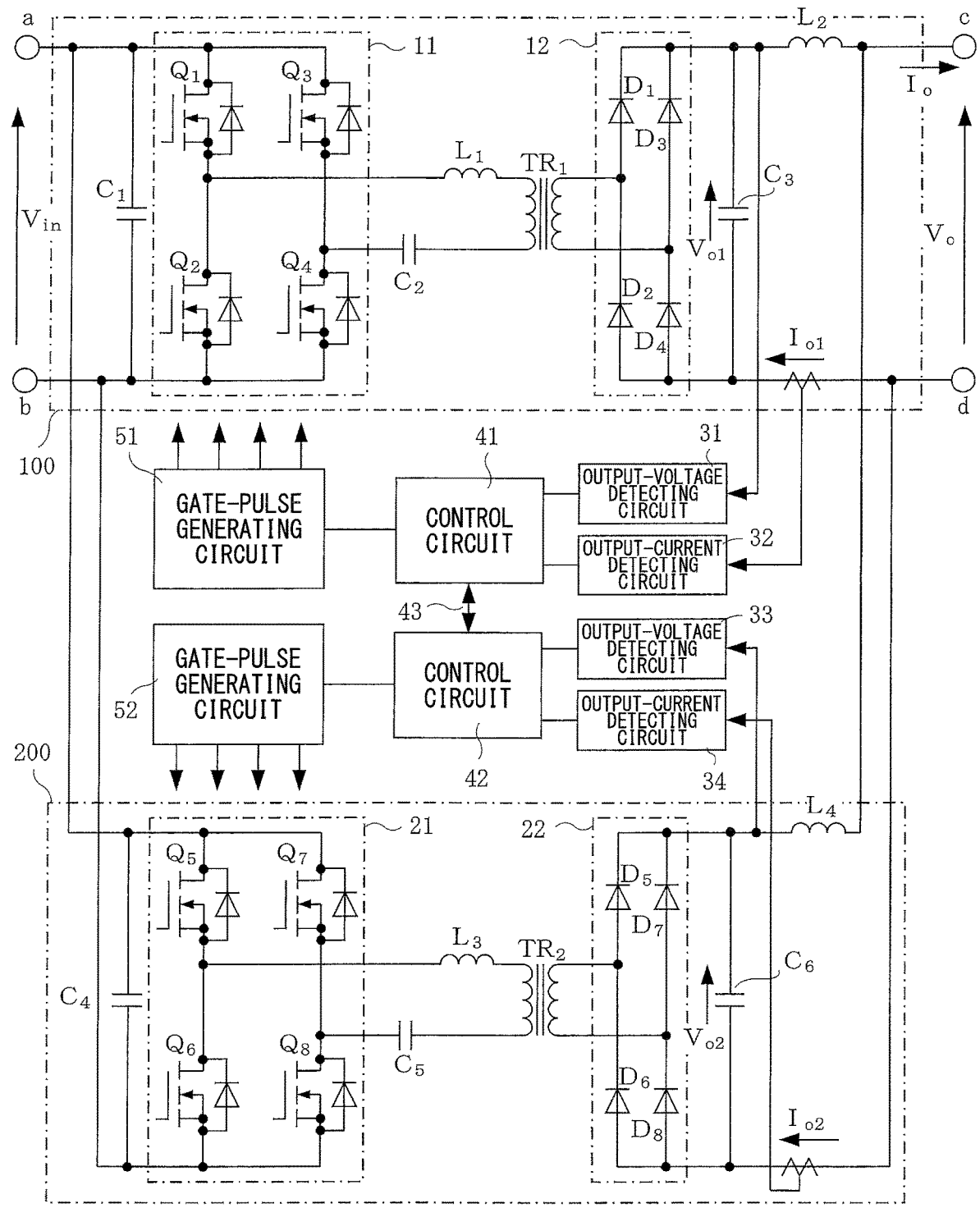
FIG. 1 is a circuit diagram according to an embodiment of the present disclosure.

FIG. 1 is a block diagram illustrating a DC-DC converter according to the present embodiment. Converter units 100 and 200 are connected in parallel, between DC input terminals a and b and DC output terminals c and d. Each of the units 100 and 200 is configured in the same manner as in related art illustrated in FIGS. 5, 6, and 9.

A control device of the converter unit 100 includes an output-voltage detecting circuit 31, an output-current detecting circuit 32, a control circuit 41, and a gate-pulse generating circuit 51 of the unit 100. A control device of the converter unit 200 includes an output-voltage detecting circuit 33, an output-current detecting circuit 34, a control circuit 42, and a gate-pulse generating circuit 52 of the unit 200.

According to the present embodiment, information such as a frequency and a phase is exchangeable between the control circuit 41 of the converter unit 100 and the control circuit 42 of the converter unit 200, via a wired or wireless communication path 43.

Due to variation in characteristics of components of the converter units 100 and 200, a relation between a switching frequency and an output voltage of each unit is assumed as described in FIG. 8. In this case, when a target value expressed as an output voltage of the DC-DC converter is set to $V_{o1}$, as described above, a switching frequency of the converter unit 100 is represented by $f_{s1}$, and a switching frequency of the converter unit 200 is represented by $f_{s2}$. In such a manner, when each of the units 100 and 200 operates at a different switching frequency, the output voltage $V_o$ and output currents $I_{o1}$ and $I_{o2}$ are pulsated in the same manner as in the third related art.

In view of the above, in the present embodiment, switching elements $Q_1$ to $Q_4$ and $Q_5$ to $Q_8$ of both units 100 and 200 are switched at a lower frequency $f_{s1}$ as a common switching frequency, from among switching frequencies $f_{s1}$ and $f_{s2}$ of the converter units 100 and 200 with respect to a target value $V_{o1}$ of an output voltage. In other words, the converter unit 100 operating at a lower frequency is used as a master and the other converter unit 200 is used as a slave, and both units 100 and 200 are controlled at a master-side switching frequency. Note that when the control circuits 41 and 42 compare switching frequencies $f_{s1}$ and $f_{s2}$ of both units 100 and 200, through the communication path 43, the master-side switching frequency, i.e., a common switching frequency is determined whereby both units 100 and 200 can easily share the common switching frequency.

In the above process, switching frequencies of both units 100 and 200 can be equalized, and thus pulsations of the output voltage $V_o$ and output currents $I_{o1}$ and $I_{o2}$ as illustrated in FIG. 13 can be avoided.

In contrast, when switching frequencies of the converter units 100 and 200 are used in common by a common switching frequency $f_{s1}$, in FIG. 8 above, respective output voltages of the units 100 and 200 are set to $V_{o1}$ and $V_{o3}$, which might result in imbalance between output currents $I_{o1}$ and $I_{o2}$ and variation in an output voltage $V_o$.

In order to solve this issue, in the present embodiment, a phase of each gate pulse for driving a given switching element of the converter unit 200 is varied in, e.g., phase-modulation control (phase-shift control), etc. as described in Japanese Patent No. 5928913, so that an output voltage $V_{o3}$ is thereby decreased to be equal to $V_{o1}$. Thereby, an output voltage of each of the units 100 and 200 is equal to a target value, and thus variation in an output voltage $V_o$ is avoided, as well as enabling currents $I_{o1}$ and $I_{o2}$ to be balanced.

Note that the expression "a phase of each drive pulse is varied" covers a method of using the above phase-modulation control, as well as a case of uniformly varying a phase of each drive pulse (gate pulse) used in units as illustrated in FIG. 7.

As one manner of regulating a phase of the gate pulse described above, FIG. 2 is a circuit diagram in which a frequency-modulation control and a phase-modulation control are switchable in the control circuit 42 and the gate pulse generating circuit 52 in FIG. 1, for example, as described in Japanese Patent No. 5928913 above. In this description, assuming that switching elements $Q_5$ to $Q_8$ of a converter unit 200 are driven to regulate an output voltage of the unit 200, such a case will be described.

Figure 2:
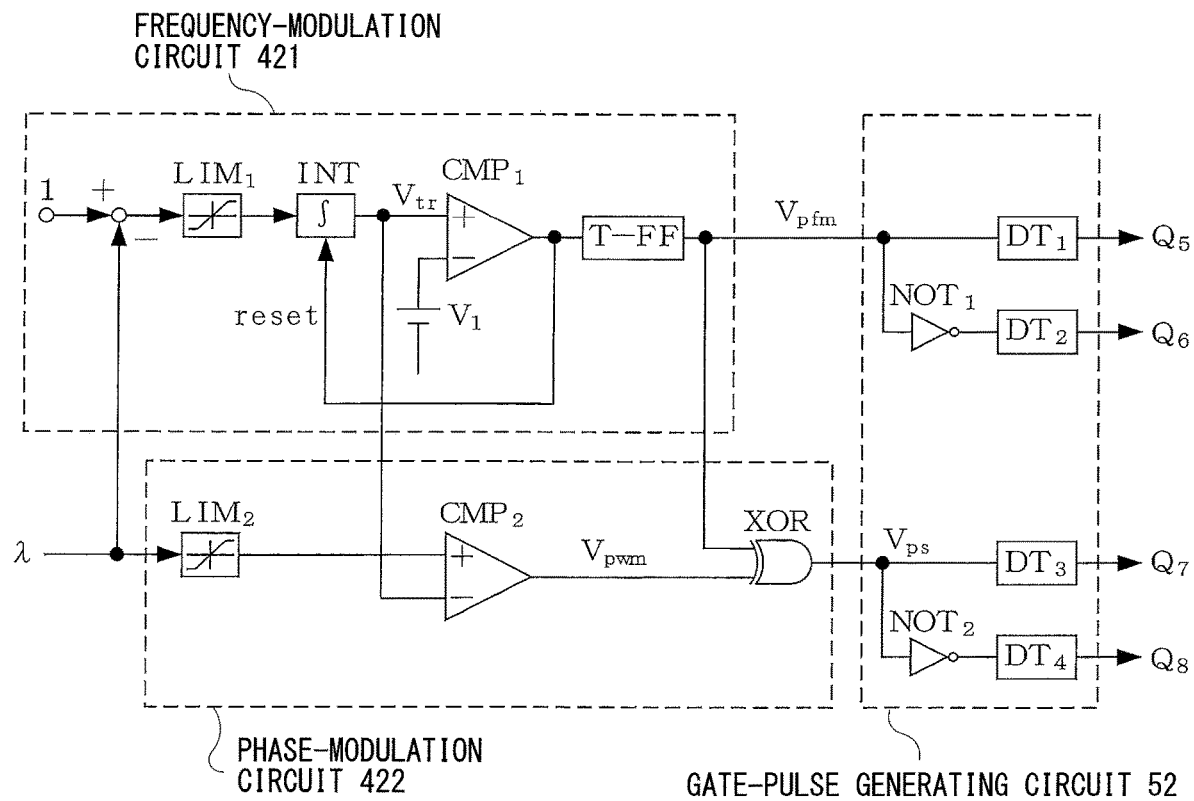
FIG. 2 is a circuit diagram illustrating an example of a main component of a control circuit according to the embodiment of the present disclosure.

In FIG. 2, a frequency-modulation circuit 421 generates a frequency-modulation signal $V_{pfm}$ from a modulation-rate command $\lambda$ (0≤$\lambda$≤1) set based on an output voltage $V_{o2}$ and output current $I_{o2}$ of the converter unit 200. The frequency-modulation circuit 421 includes a limiter $LIM_1$ (lower limit: 1−$\lambda_c$, upper limit: $\lambda_{lim}$); an integrator INT; a comparator $CMP_1$; and a T flip-flop T-FF. Note that 0<$\lambda_c$<$\lambda_{lim}$<1, and $\lambda_c$=$V_1$ (a reference voltage for the comparator $CMP_1$).

A phase-modulation circuit 422 also generates a phase-modulation signal $V_{ps}$ based on a modulation-rate command $\lambda$, a carrier signal $V_{tr}$, and an output signal of the T-flip flop T-FF. The phase-modulation circuit 422 includes a limiter $LIM_2$ (lower limit: 0, upper limit: $\lambda_c$); a comparator $CMP_2$; and an exclusive or gate XOR.

Further, based on a frequency-modulation signal $V_{pfm}$ and a phase-modulation signal $V_{ps}$, a gate pulse generating circuit 52 generates gate pulses that are applied to the switching elements $Q_5$ to $Q_8$ of the DC-to-AC converter 21 of the converter unit 200, by using inverted logic gates $NOT_1$ and $NOT_2$ and on-delay circuits $DT_1$ to $DT_4$.

Note that the above circuits are also embedded in the control circuit 41 of the converter unit 100.

In FIG. 2, a frequency-modulation control and a phase-modulation control are switched in accordance with the magnitude of a modulation-rate command $\lambda$. When a range of modulation-rate commands $\lambda$ is greater than $\lambda$, a frequency-modulation control is performed. When $\lambda$ falls below smaller than $\lambda_c$, operation is shifted to a phase-modulation control.

Thereby, as illustrated in FIG. 8, when an output voltage $V_{o3}$ of the converter unit 200 is higher than an output voltage $V_{o1}$ of the converter unit 100, a modulation-rate command $\lambda$ in FIG. 2 is regulated at the control circuit 42 of the converter unit 200, so as to be smaller than $\lambda_c$; and then the switching elements $Q_5$ to $Q_8$ are driven. Thereby, control in which an output voltage $V_{o3}$ is decreased to be equal to $V_{o1}$ is performed.

In the present embodiment, as described above, for example, when the converter unit 100 operating at a lower switching frequency is used as a master and the other converter unit 200 is used as a slave, output voltages of both units 100 and 200 are assumed to be equalized in a manner such that a frequency-modulation control or a phase-modulation control as described in Japanese Patent No. 5928913 above, is performed with respect to the master-side converter unit 100; and a phase-modulation control as described above is performed with respect to the slave-side converter unit 200.

Figure 3:
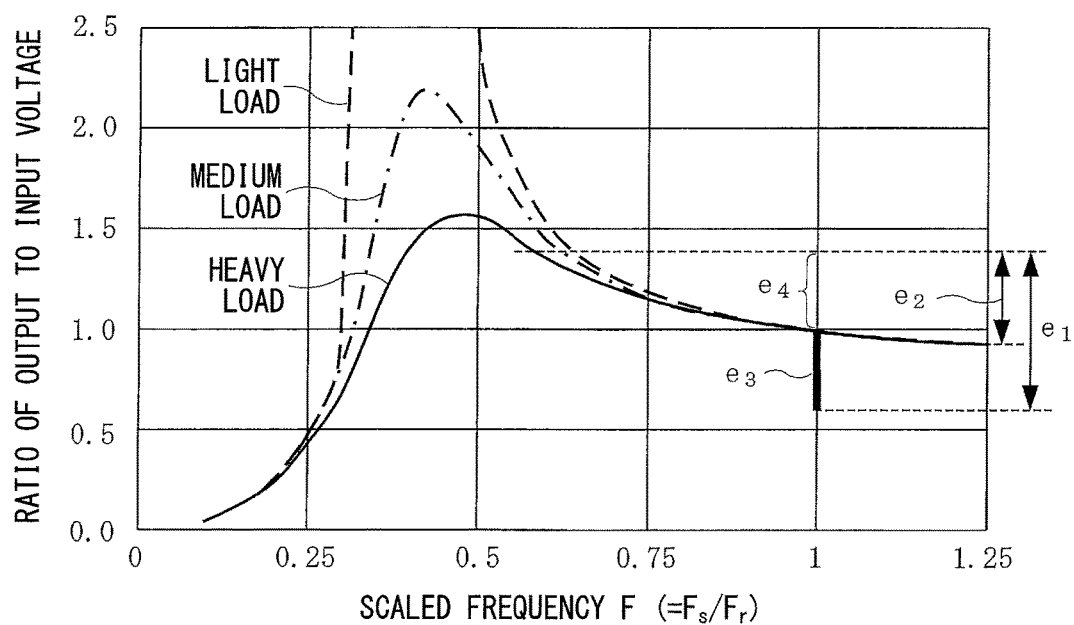
FIG. 3 is a waveform diagram illustrating a relation between a scaled frequency and a ratio of output to input voltage according to the embodiment of the present disclosure.

Note that FIG. 3 is a characteristic diagram illustrating a relationship between a scaled frequency F ($F_s/F_r$) of a converter unit (e.g., converter unit 200) corresponding to the magnitude of a load and a ratio of output to input voltage. According to the diagram, $F_s$ represents a switching frequency, and $F_r$ represents a resonant frequency. In the vertical line associated with the ratio of output to input voltage, $e_1$ represents a controllable range in the present embodiment; $e_2$ represents a controllable range in third related art; $e_3$ represents a controllable range in the phase-modulation control; and $e_4$ represents a controllable range in the frequency-modulation control.

In FIG. 3, when control is performed in a manner such that the scaled frequency F is 1.0, i.e., when switching frequencies are equalized and each switching frequency is a resonant frequency, if a frequency-modulation control is switched to a phase-modulation control at a point (boundary point between ranges $e_3$ and $e_4$) at which a ratio of output to input voltage is 1.0, switching can be smoothly performed without varying an output voltage $V_o$ sharply.

Figure 4:
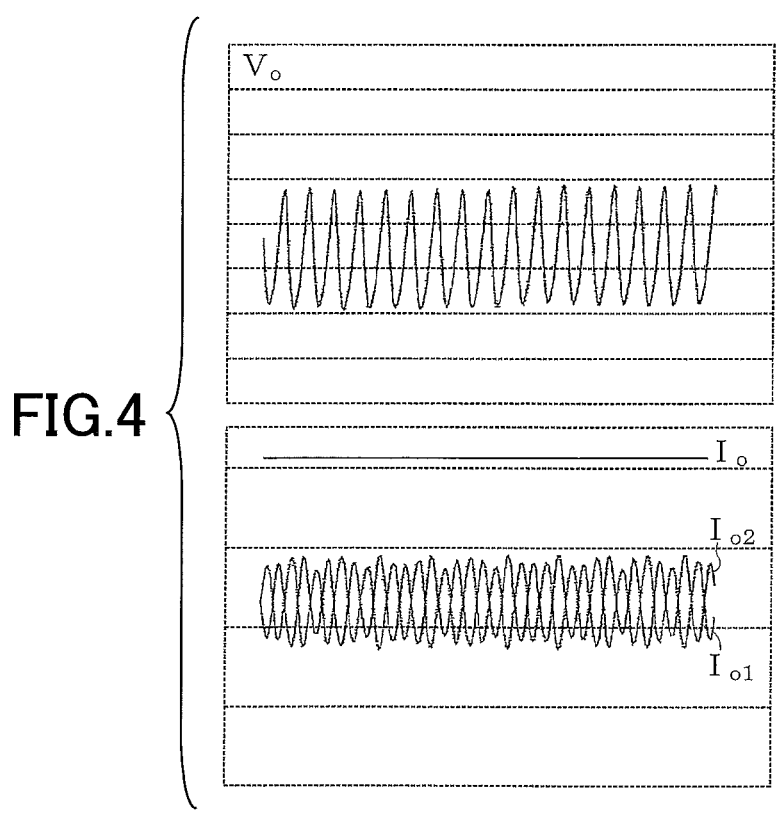
FIG. 4 is a waveform diagram illustrating an output voltage and an output current according to the embodiment of the present disclosure.

FIG. 4 is a waveform diagram illustrating an output voltage $V_o$ and output currents $I_{o1}$, $I_{o2}$, and as regulated in the present embodiment.

Compared to second related art illustrated in FIG. 12B), imbalance between output currents $I_{o1}$ and $I_{o2}$ of the units 100 and 200 is improved and variation in an output voltage $V_o$ is decreased.

Additionally, it is understood that pulsations of the output currents $I_{o1}$ and $I_{o2}$ and the output voltage $V_o$ are reduced compared to third related art illustrated in FIG. 13.

Note that in the present embodiment of the present disclosure, each primary-side DC-to-AC converter of the converter units 100 and 200 may include a full-bridge circuit consisting of switching elements or a half-bridge circuit. Each secondary-side rectifier circuit of the converter units 100 and 200 may include a full-wave rectifier circuit (a bridge type full-wave rectifier circuit or a center tap type full-wave rectifier circuit) or a half-wave rectifier circuit. Thus, by choosing an optimum circuit manner under conditions of an input voltage, an output voltage, or/and an output current, etc. of a given DC-DC converter, it is possible to reduce the size, losses, and costs of the entire converter.

What is claimed is:
1. A DC-DC converter comprising:
a plurality of converter units electrically connected in parallel, each converter unit including:
a DC-to-AC converter configured to convert DC power to AC power through operation of semiconductor switching elements; and
a rectifier circuit electrically connected at an AC output side of the DC-to-AC converter via a resonant circuit and an insulating transformer; and
a plurality of control devices with respect to the respective converter units, each control device including:
a control circuit configured to generate a modulation-rate command based on an output voltage and an output current of a corresponding converter unit; and
a pulse generating circuit configured to generate, based on the modulation-rate command, a drive pulse applied to each semiconductor switching element,
wherein each of the plurality of control devices is configured to determine, based on a relational characteristic of a switching frequency and an output voltage of a corresponding converter unit, a switching frequency for achieving a target value indicative of a same output voltage that is the same for all the converter units, and to select a lowest frequency as a common switching frequency, from among determined switching frequencies, the selected common switching frequency being shared by multiple control circuits, wherein each control circuit corresponds to a respective one of the plurality of converter units, and wherein all of the converter units are configured to operate with drive pulses each of which is at the common switching frequency.

2. The DC-DC converter according to claim 1, wherein a phase of each drive pulse used in the converter units is varied such that output voltages of the converter units are equalized.

3. The DC-DC converter according to claim 2, wherein one or more converter units are controlled in phase modulation based on the modulation-rate command, such that the phase of each drive pulse is varied.

4. The DC-DC converter according to claim 1, wherein each DC-to-AC converter includes a full-bridge circuit including the semiconductor switching elements or a half-bridge circuit, and wherein each rectifier circuit includes a full-wave rectifier circuit or a half-wave rectifier circuit.

5. The DC-DC converter according to claim 2, wherein each DC-to-AC converter includes a full-bridge circuit including the semiconductor switching elements or a half-bridge circuit, and wherein each rectifier circuit includes a full-wave rectifier circuit or a half-wave rectifier circuit.

6. The DC-DC converter according to claim 3, wherein each DC-to-AC converter includes a full-bridge circuit including the semiconductor switching elements or a half-bridge circuit, and wherein each rectifier circuit includes a full-wave rectifier circuit or a half-wave rectifier circuit.

* * * * *